United States Patent
Liu et al.

(10) Patent No.: US 10,186,705 B2
(45) Date of Patent: Jan. 22, 2019

(54) INSTRUMENTATION TO DRY-DELIVER SLMP PARTICLES TO THE LITHIUM-ION ELECTRODE

(71) Applicants: Gao Liu, Piedmont, CA (US); Vince Battaglia, San Anselmo, CA (US); Zhihui Wang, Fremont, CA (US)

(72) Inventors: Gao Liu, Piedmont, CA (US); Vince Battaglia, San Anselmo, CA (US); Zhihui Wang, Fremont, CA (US)

(73) Assignee: The Regents of the University of California, Oakland, CA (US)

( * ) Notice: Subject to any disclaimer, the term of this patent is extended or adjusted under 35 U.S.C. 154(b) by 1098 days.

(21) Appl. No.: 14/550,766

(22) Filed: Nov. 21, 2014

(65) Prior Publication Data

US 2015/0144013 A1 May 28, 2015

Related U.S. Application Data

(60) Provisional application No. 61/908,290, filed on Nov. 25, 2013.

(51) Int. Cl.
*H01M 4/04* (2006.01)
*B30B 3/04* (2006.01)
*B29C 43/24* (2006.01)
*H01M 4/139* (2010.01)

(52) U.S. Cl.
CPC ........... *H01M 4/0435* (2013.01); *B29C 43/24* (2013.01); *B30B 3/04* (2013.01); *H01M 4/139* (2013.01)

(58) Field of Classification Search
CPC ........... B30B 3/00; B30B 3/04; H01M 4/139; H01M 4/0435; B29C 43/24
See application file for complete search history.

(56) References Cited

U.S. PATENT DOCUMENTS

| | | | | |
|---|---|---|---|---|
| 4,942,434 A | * | 7/1990 | Nakai | G03G 15/206 100/155 R |
| 5,418,605 A | * | 5/1995 | Arahira | G03G 15/0233 361/225 |
| 2010/0089262 A1 | * | 4/2010 | Seong | B41F 9/14 101/158 |
| 2011/0051208 A1 | * | 3/2011 | Hirano | H04N 1/6019 358/518 |
| 2013/0039679 A1 | * | 2/2013 | Nakaegawa | G03G 15/1615 399/297 |

FOREIGN PATENT DOCUMENTS

CN 101598919 A * 12/2009

* cited by examiner

*Primary Examiner* — Jimmy T Nguyen

(57) ABSTRACT

An embodiment of the invention describes an calendaring apparatus comprising a roller press comprising a first roller and a second roller, a static electricity generator, a motor drive system in communication with the first roller and the second roller to impart rotation to first roller and the second roller, wherein the static electricity generator imparts a static charge to a surface of the first roller, and a material holding tray for holding a material in communication with the first roller.

6 Claims, 3 Drawing Sheets

INSTRUMENTATION TO DRY-DELIVER SLMP PARTICLES TO THE LITHIUM-ION ELECTRODE

CROSS REFERENCE TO RELATED APPLICATIONS

This application claims priority to U.S. Provisional Application Ser. No. 61/908,290 filed Nov. 25, 2013, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

The present invention relates to the field of Lithium ion batteries.

Related Art

Rechargeable lithium-ion batteries hold great promise as energy storage devices to solve the temporal and geographical mismatch between the supply and demand of electricity, and are therefore critical for many applications such as portable electronics and electric vehicles. Electrodes in these batteries are based on intercalation reactions in which Li+ ions are inserted (extracted) from an open host structure with electron injection (removal). However, the current electrode materials have limited specific charge storage capacity and cannot achieve the higher energy density, higher power density, and longer lifespan that all these important applications require.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Various embodiments of the present invention describe that the application of Stabilized Lithium Metal Powder (SLMP) in lithium ion batteries can help increase the coulombic efficiency and cycle performance of batteries, and reduce the manufacturing cost. However, with current technology, challenges exist for applying SLMP in lithium ion batteries. Typically, flammable organic solvents such as hexane and toluene are usually used to introduce SLMP into an electrode, either by mixing SLMP in the slurry or by spraying SLMP on top of an electrode laminate. One concern is that the large amount of flammable solvents represents a potential fire hazard. The lithium metal carrier film (LMCF) technique (developed by FMC) partially solves the problem of flammable solvents, but this technique introduces additional steps during SLMP application and increases the process cost. An embodiment of the invention describes an apparatus to apply SLMP to electrodes for use in lithium ion batteries without involving flammable solvents and at low cost. Another embodiment of the invention describes a method by which SLMP can be incorporated into lithium ion battery electrodes without using any organic flammable solvents.

In one embodiment, an amount of SLMP may be loaded on top of an electrode laminate and can be well controlled. Furthermore, a calendaring step of SLMP loaded electrode laminate to activate SLMP can be achieved simultaneously. The electrode with activated SLMP on a surface is then ready for cell assembly.

Figure 1:
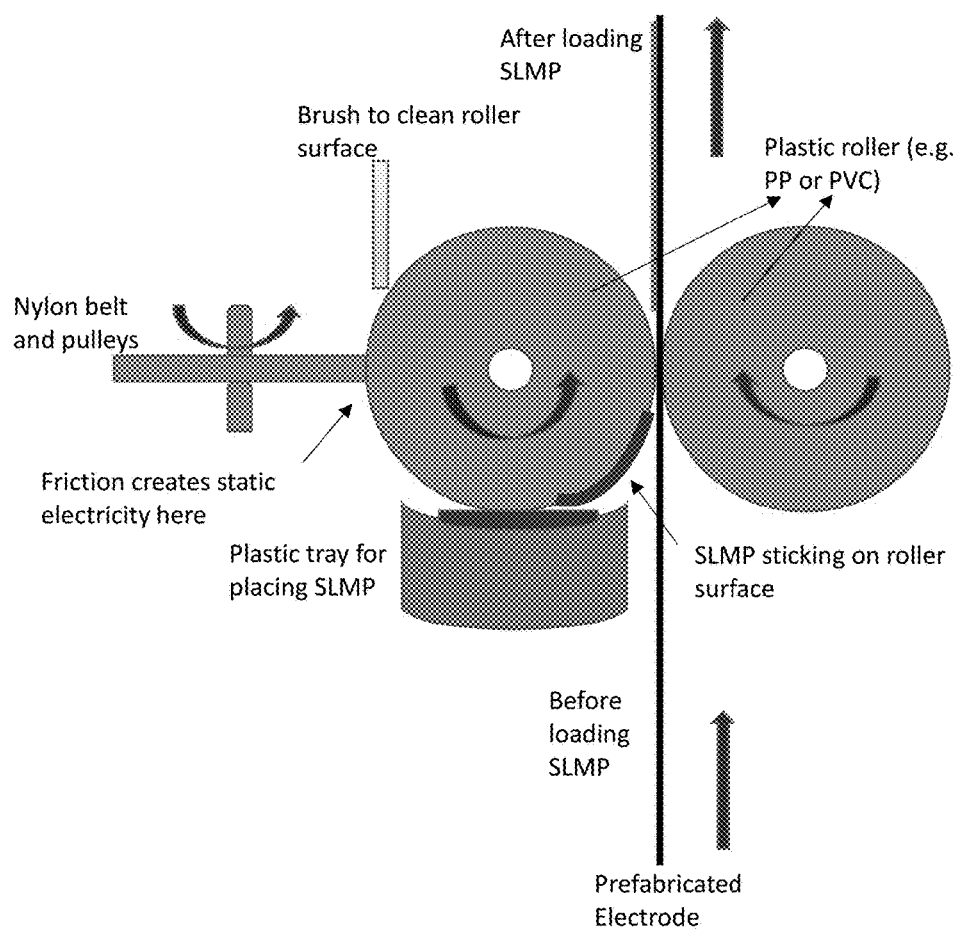
FIG. 1 illustrates a front view of a schematic diagram of a Stabilized Lithium Metal Powder (SLMP) loading system.
Figure 2:
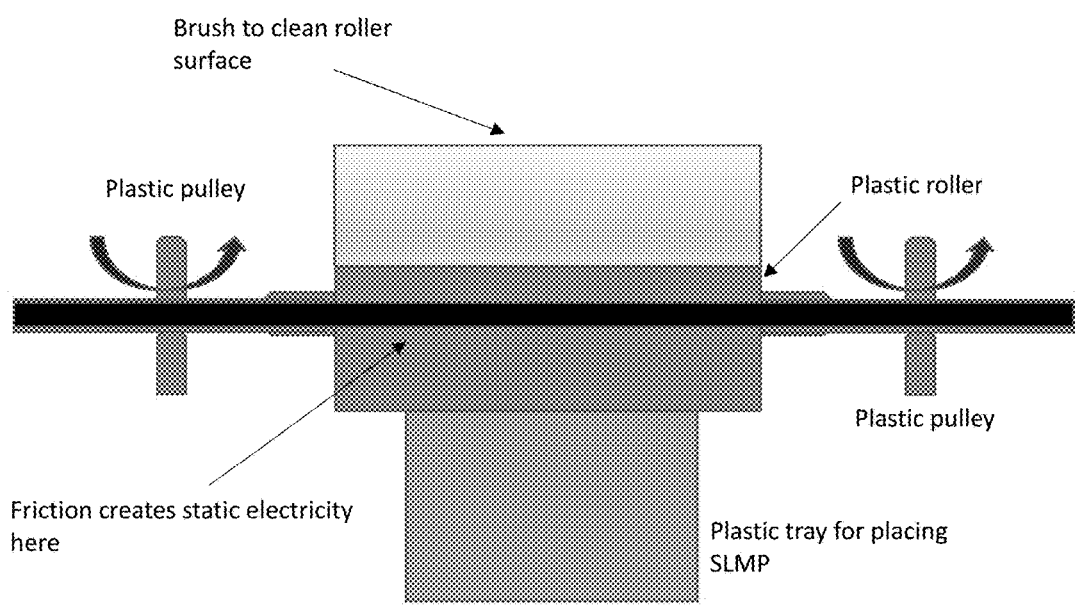
FIG. 2 illustrates a side view of a schematic diagram of the SLMP loading system.
Figure 3:
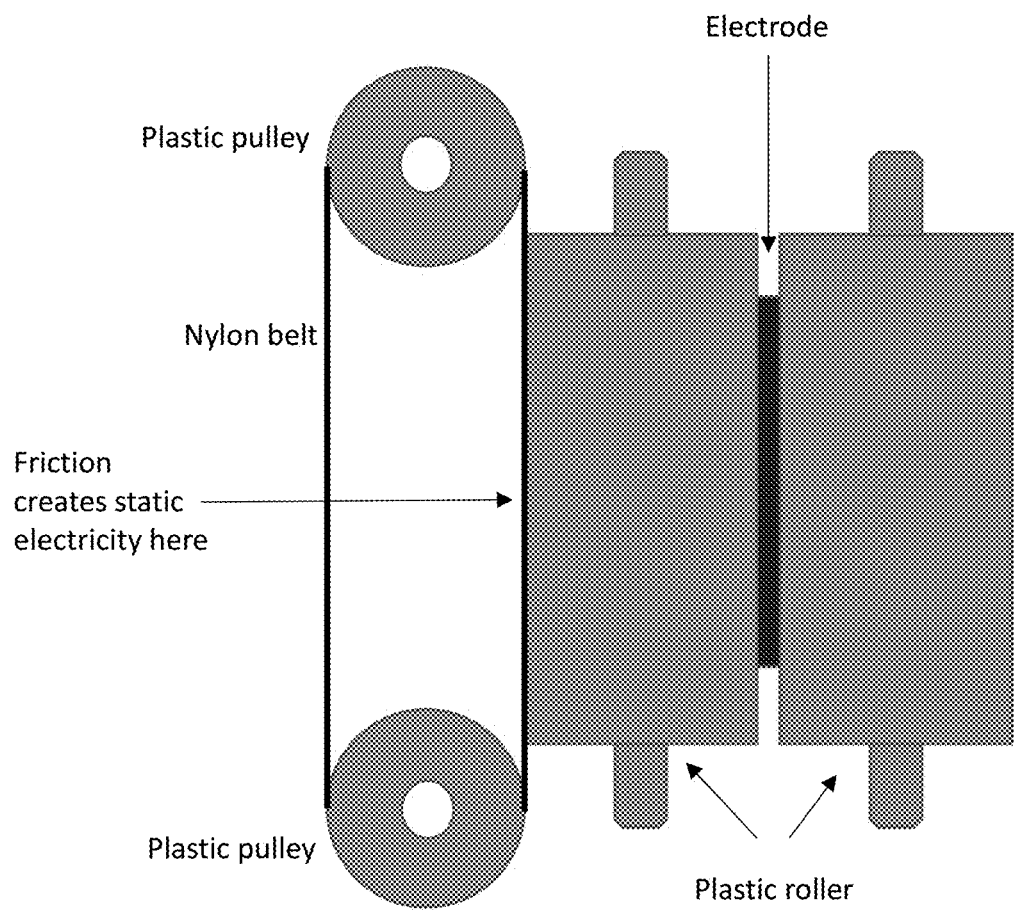
FIG. 3 illustrates a top view of a schematic diagram of the SLMP loading system.

One embodiment of this invention describes a system to create static electricity on the roller surface to pick up SLMP and then load SLMP onto an electrode surface. SLMP on the loaded electrode is then activated by compression. This new system consists of two major parts a roller press and a static electricity generator. A schematic diagram is shown in FIG. 1). The two rollers may be made of polypropylene. The left roller rotates counterclockwise and the right roller rotates clockwise (FIG. 1). A plastic tray with SLMP is placed right below the left roller. The prefabricated electrode is placed in the roller gap from below and moves upward. Two plastic pulleys with a nylon belt are driven by a motor (FIG. 2 and FIG. 3). Part of one side of the nylon belt touches the surface of the left roller and parallel to the axis of the roller. As the nylon belt rubs the roller surface, the static electricity created will stick the SLMP on the roller surface. With rotation of the roller and compression from the roller press, SLMP stuck on the surface can be transferred onto the electrode surface and activated simultaneously (FIG. 1). An amount of SLMP loaded on the electrode can be controlled by controlling the static electric charge, which can be adjusted by changing rotation speed of the nylon belt. Therefore, a specific loading of SLMP can be obtained upon specific requirement.

This invention thus describes a method and apparatus to apply SLMP in lithium ion battery electrodes without the use of a flammable solvent and with a lower relative cost. This invention provides a new way of achieving improved results (e.g., higher coulomic efficiency and better cycle performance) more productively and more efficiently.

We claim:

1. A calendaring apparatus comprising:
   a roller press comprising a first roller and a second roller;
   a static electricity generator comprising a motor, a first pulley, a second pulley, and a belt, the belt in communication with the first roller, friction between the belt and the first roller to impart a static charge to a surface of the first roller;

a motor drive system in communication with the first roller and the second roller to impart rotation to the first roller and the second roller, the belt being rotated in a direction perpendicular to a rotation direction of the first roller; and a material holding tray for holding a material in communication with the first roller, the surface of the first roller to collect the material from the holding tray utilizing the static charge.

2. The apparatus of claim 1, wherein the first roller and the second roller comprise polypropylene or polyvinylchloride.

3. The apparatus of claim 1, wherein the first roller rotates clockwise and the second roller rotates counterclockwise.

4. A calendaring apparatus comprising:

a roller press comprising a first roller and a second roller;

a static electricity generator comprising a belt in communication with the first roller, friction between the belt and the first roller to impart a static charge to a surface of the first roller;

a motor drive system in communication with the first roller and the second roller to impart rotation to the first roller and the second roller, the belt being rotated in a direction perpendicular to a rotation direction of the first roller; and a material holding tray for holding a material in communication with the first roller, the surface of the first roller to collect the material from the holding tray utilizing the static charge.

5. The apparatus of claim 4, wherein the first roller and the second roller comprise polypropylene or polyvinylchloride.

6. The apparatus of claim 4, wherein the first roller rotates clockwise and the second roller rotates counterclockwise.

* * * * *